Nov. 6, 1951  C. C. SHUMARD  2,573,813
SEQUENTIAL PULSE GENERATOR
Filed Sept. 30, 1948
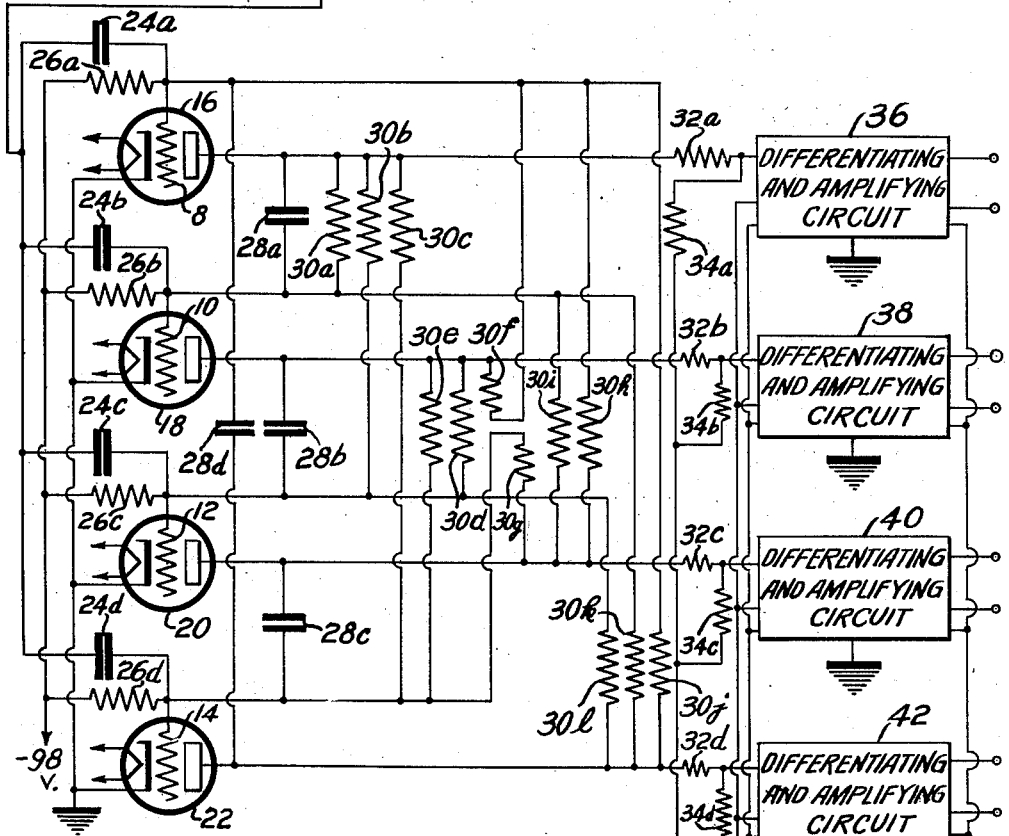
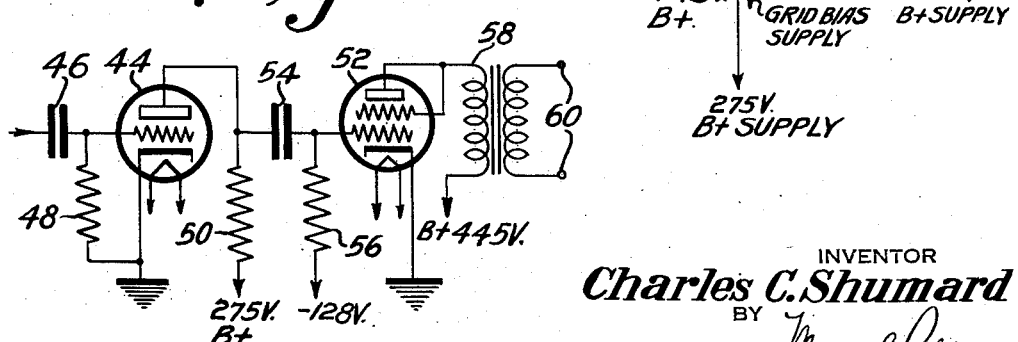
INVENTOR
Charles C. Shumard
BY
Morris A. Rabkin
ATTORNEY Patented Nov. 6, 1951

2,573,813

UNITED STATES PATENT OFFICE 2,573,813

SEQUENTIAL PULSE GENERATOR

Charles C. Shumard, Moorestown, N. J., assignor to Radio Corporation of America, a corporation of Delaware Application September 30, 1948, Serial No. 52,102

5 Claims. (Cl. 250—27)

This invention relates generally to improvements in apparatus for the generation of square wave power sequentially delivered at a plurality of output points.

The principal objects of the invention are to provide improved apparatus for generating pulses of square wave power in a certain sequential order at a plurality of output points; to provide an improved circuit which may be operated in a number of ways to provide different sequential pulsing patterns; to provide simple apparatus for sequential pulsing and to provide an improved circuit for sequentially generating short pulses of energy which circuit may utilize any number of control tubes depending upon the total number of pulses desired to a single sequence.

These and other objects will be more readily apparent and the invention will be better understood from the following specification, including the drawings of which:

Fig. 1 is a circuit diagram, partially schematic, of one embodiment of apparatus for carrying out the present invention, and Fig. 2 is a circuit diagram of a suitable conventional utilization circuit which may form a part of the circuit shown schematically in Fig. 1.

Referring to Fig. 1, a conventional type of pulsing oscillator such as a saw-tooth oscillator 2 having a frequency control 4 has one output lead 6 connected to the grids 8, 10, 12 and 14 of each of four triode tubes 16, 18, 20 and 22 and the other output lead grounded. Instead of being four separate tubes these may consist of two twin triode tubes of the type 6SN7-GT. Each connection from the output of the oscillator to a grid includes a coupling capacitor 24a, 24b, 24c or 24d. All of these coupling capacitors are of equal value.

Each of the grids 8, 10, 12 and 14 is also connected to a source of negative biasing voltage through grid leak resistors 26a, 26b, 26c and 26d, respectively. These resistors are also of equal value.

The cathodes of all of the triodes are connected to ground and each filament is connected to a suitable common source of filament potential which may be tapped from the secondary of a transformer having its primary connected to the regular 115 v. supply lines.

The anode of each of the four tubes is connected to the grid of the next tube in the series through a coupling capacitor and to the grid of every other tube in the series through coupling resistors. For example, the anode of tube 16 is connected to the grid of tube 18 through capacitor 28a. The anode of the tube 16 is also connected to the grid of tube 18 through coupling resistor 30a, to the grid of tube 20 through coupling resistor 30b and to the grid tube 22 through coupling resistor 30c.

In a similar manner, the anode of tube 18 is connected to the grid of tube 20 through capacitor 28b. The anode of tube 18 is also connected to the grid of tube 20 through coupling resistor 30d, to the grid of tube 22 through coupling resistor 30e and to the grid of tube 16 through coupling resistor 30f.

Also, the anode of tube 20 is connected to the grid of tube 22 through capacitor 28c. The anode of tube 20 is also connected to the grids of each of tubes 22, 16 and 18 through the coupling resistors 30g, 30h and 30i, respectively.

Finally, the anode of tube 22 is connected to the grid of tube 16 through capacitor 28d and to the grids of each of tubes 16, 18 and 20 through coupling resistors 30j, 30k and 30l, respectively.

The anode of each of the tubes 16, 18, 20 and 22 is also connected to the B+ supply terminal through a pair of anode resistors. The anode of tube 16 is connected to this supply through resistors 32a and 34a. The anode of tube 18 is connected through resistors 32b and 34b. The anode of tube 20 is connected through resistors 32c and 34c. The anode of tube 22 is connected through resistors 32d and 34d.

In a preferred embodiment of the invention the output of each of the tubes 16, 18, 20 and 22 is fed to a differentiating and amplifying circuit 36, 38, 40 and 42, respectively, of conventional type. The differentiating and amplifying circuit 36 is connected to a point between the anode resistors 32a and 34a. In a similar manner each of the other differentiating and amplifying circuits is connected to a point between the corresponding anode resistors of tubes 18, 20 and 22, respectively.

The sequential pulses which appear at the outputs of each of these differentiating and amplifying circuits may be used to trigger a series of thyratron tubes or may be utilized for other purposes.

Although there are several modes of operation for a circuit such as above described, the present invention is more particularly concerned with a mode of operation in which one tube at a time becomes conducting and each tube becomes conducting in a regular predetermined order.

The preferred mode of operation will now be described in general terms and this will be followed by a more specific example of operation.

Positively peaked pulses from the oscillator 2 are supplied simultaneously to all grids of the triodes through the coupling capacitors 24a—24d. Since one of the output leads of the oscillator is grounded, these pulses are coupled capacitively between the grids and ground. When certain relations exist between the grid and plate voltages this circuit has the unique feature that three of the triodes become biased to cut off while the other triode becomes conducting and all remain in this state until the next pulse from the oscillator is applied to all the tubes simultaneously. After each application of a triggering pulse to all tubes, only that tube will conduct which is coupled through a capacitor 24a—24d to the presently conducting tube. That tube which was conducting regroups with the other two non-conducting tubes. Thus, each triode becomes conducting in sequential predetermined order.

As a particular tube becomes suddenly conducting, the voltage at its anode suddenly drops from a high positive to a low negative value and remains at this low value until another triggering impulse is transmitted. It then returns to its previous high value and remains there, unaffected by the next two pulses. Thus, a square wave of negative voltage is generated at each triode anode. The duration of each such wave is dependent only upon the starting and ending pulses bounding the conducting period for a particular tube. Thus, for equally spaced pulses, all square wave periods at each anode would have the same duration, but with irregular pulsing could be as long as desired. For equally timed pulses, however, each tube conducts for one-fourth of the time of a complete ring cycle in the case of the four triode generator and is non-conducting for the remaining three-fourths of a complete sequence of operations.

Some specific sets of circuit values will now be given and the manner in which the circuit operates will be more fully explained.

Where 2 RCA 6SN7-GT tubes are used (26a—26d) =82,000 ohms, (30a—30b) =390,000 ohms, (32a—32d) =43,000 ohms, (34a—34d) =39,000 ohms and (28a—28d) =(24a—24d) =50 $\mu\mu f$.

Anode voltage__ B+ =   135     200     175
Grid voltage_____=  −70±3  −80±5  −98±6

For any given B+ supply voltage, a corresponding value of grid voltage may be found. The range is continuous and may be extended above or below the values given above. The circuit constants are not critical as to values but, for symmetry, once a nominal value is chosen, all values should be selected within ±5% tolerances.

Assuming now that tube 16 is conducting, high anode current flows through anode resistors 32a and 34a connected to the anode of tube 16. Since the potential at this anode is low and it is connected to ground through the three additional paths, each including one of the resistors 30a—30c and 26b—26d and the bias supply, the grid bias voltage at each of the grids of the triodes 18, 20 and 22, which is present at the junction of each resistor pair such as 32a—34a, is increased sufficiently that triodes 18, 20 and 22 are cut off. The bias on tube 16 which is conducting, however, is supplied partly through the grid leak resistor 26a and through the resistors 30f, 30h and 30j, which are connected to the anodes of tubes 18, 20 and 22, respectively.

Since the anodes of tubes 18, 20 and 22 are at high potential due to the non-conducting condition of these tubes, the bias is supplied largely by the anode supply rather than the bias supply. The grid of tube 16 is therefore biased low enough to permit tube 16 to conduct continuously in a steady state condition. When the steady state condition is upset, however, by a positive pulse of sufficient magnitude and short duration supplied to all grids, the potentials of all grids will momentarily rise. The grid circuit of tube 16, however, since this tube is conducting, will have considerably lower impedance than the grid circuits of tubes 18, 20 and 22, which are non-conducting. Hence, the pulse voltage applied to the grids of tubes 18, 20 and 22 will be of greater magnitude and steeper rise than that applied to the grid of tube 16 due to the lower voltage drops in the corresponding coupling capacitors of the non-conducting tubes.

The anode currents of tubes 18, 20 and 22 will start to rise increasing the bias on tube 16 in the manner described above. The anode potential on tube 16 will rise simultaneously maintaining an increasing positive potential on the grid of tube 18 through its coupling capacitor 28a until tube 18 is fully conducting.

In starting to conduct, and until fully conducting, the anode potential of tube 18 will drop, increasing the bias on the grid of tube 20 and overcoming the effects of the original positive pulse on the grid of this tube keeping it non-conducting. Likewise tube 22 is kept non-conducting since the effect of the original pulse on the grid of this tube is neutralized by the negative pulse transmitted from the anode of tube 20 through coupling capacitor 28c to the grid of tube 22 by the original tendency of the anode potential of tube 20 to drop when pulsed.

Thus, tube 18 now becomes conducting and tubes 20, 22 and 16 are the non-conducting tubes. Since this is a stable state, this condition ensues until all grids are again pulsed, resulting in tube 20 becoming conducting and the other three tubes becoming non-conducting. In this manner tubes 16, 18, 20 and 22 become sequentially conducting and then the series repeats.

The remainder of the circuit utilizes in conventional manner the sequentially obtained square waves to generate relatively high power positive pulses of short duration. It is to be understood that the utilization circuit to be described is merely an example of how the sequential pulse generating circuit of the present invention may be utilized to accomplish a useful result such as causing thyratrons to conduct in a desired sequential order. Any other desired type of suitable utilization circuit may be used without departing from the spirit of the invention.

As indicated schematically in Fig. 1, the outputs of each of the triodes which form a part of the ring circuit may be fed to a differentiating and amplifying circuit 36—42. Each of these differentiating and amplifying circuits may be exactly the same. One of them is more particularly illustrated in Fig. 2. For example, at the 32a—34a resistor junctions is connected the grid of a triode 44 (which may also be one-half of a 6SN7-GT) through a differentiating capacitor 46. A resistor 48, which forms a part of the differentiating circuit, is connected between the capacitor 46 and the cathode of tube 44. The anode of tube 44 is connected to the power supply through an anode resistor 50. The anode of tube 44 is coupled to the control grid of a tetrode (operated as triode) 52 through a coupling capacitor 54. The control grid of tube 52 may also be connected to a suitable source of bias supply through a grid leak resistor 56.

The anode of tube 52 is connected to one side of the primary of an output transformer 58 to the other side of which is connected a source of positive voltage.

This part of the circuit operates as follows. At the 32a—34a resistor junction, a portion of each square wave of voltage is differentiated by the corresponding combination, capacitor 46 and resistor 48, and applied, as a positive pulse at the beginning of the square wave and as a negative pulse at the end of the square wave to the grid of the triode 44. This triode (also each similarly functioning tube in the other three differentiating and amplifying circuits) is operated at zero bias and substantially maximum anode current for the anode voltage used and tube 52 (and each similarly functioning tube in the other like circuits) is biased to plate current cut-off. Thus, only the negative pulses obtained from the square wave of voltage are effective in producing output from tube 52 since only these negative pulses produce sequentially large changes in anode current in tube 44. In addition, only the positive pulses generated at the anode of the tube 44 by the negative pulses on its grid cause current to flow in the anode circuit of tube 52 since it is biased to cut-off as stated above. Thus, sequentially generated pulses of voltage are generated at the output terminals 60 of pulse transformer 58—and at the output terminals of similar transformers which may be a part of the other differentiating and amplifying circuits 38, 40 and 42.

When properly polarized, these pulses, which for thyratron operation must be positive, may be used to cause thyratrons (not shown) to fire in sequential order. Negative pulses may also be obtained to operate different forms of apparatus requiring sequential negative pulsing. Although in the example chosen the symmetrical ring type circuit, which is the essential part of the pulse generating system of the present invention, has four simiar parts, these parts may be contracted to 3 or 2 or may be expanded indefinitely so as to control as many utilization circuits as desired.

I claim as my invention:

1. In apparatus for applying square wave energy for periods of brief duration sequentially to a predetermined series of output points, a ring circuit system comprising a plurality of square wave generating circuits numerically equal to that of said series, each of said circuits including a vacuum tube having at least a cathode, an anode and a control electrode, means for maintaining all of said cathodes at ground potential, means for capacitively coupling a sequence of positively peaked pulses of electrical energy between said control electrodes and ground simultaneously, means for increasing the bias voltage of said control electrodes to a sufficient degree to prevent conduction in all but one of said tubes when one of said pulses is applied, thereby permitting conduction in only one of said tubes, and means for rendering conductive the next succeeding tube in said series when the next succeeding pulse is applied to all of said control electrodes, said last mentioned means comprising means for applying a positive potential from the anode of the most recently conducting tube to the control electrode of said next succeeding tube in said series.

2. Apparatus according to claim 1 in which said means for applying positive peaked pulses is a saw-tooth generator.

3. Apparatus according to claim 1 in which said means for applying a positive potential from the anode of the most recently conducting tube to the control electrode of the next succeeding tube comprises capacitive coupling means connected between said anode and said control electrode.

4. Apparatus according to claim 1 including means responsive to a rise in the anode current of said non-conducting tubes for increasing the control electrode bias of said conducting tube such that said conducting tube is rendered non-conducting when the next succeeding pulse is applied to all of said control electrodes.

5. Apparatus according to claim 1 in which said means for increasing the bias voltage on the control electrodes of all but one of said tubes to a sufficient degree to prevent conduction is responsive to a suddenly dropping anode potential in the tube next preceding it in said series when one of said pulses is applied to all of said control electrodes.

CHARLES C. SHUMARD.

REFERENCES CITED

The following references are of record in the file of this patent:

FOREIGN PATENTS

| Number | Country | Date |
| --- | --- | --- |
| 572,884 | Great Britain | Oct. 29, 1945 |